United States Patent [19]
Chitnis et al.

[11] Patent Number: 5,908,547
[45] Date of Patent: Jun. 1, 1999

[54] YTTRIUM CONTAINING ZEOLITE Y CRACKING CATALYST

[75] Inventors: Girish K. Chitnis, Chadds Ford, Pa.; Jocelyn A. Kowalski, Clarksboro, N.J.

[73] Assignee: Mobil Oil Corporation, Fairfax, Va.

[21] Appl. No.: 08/091,428

[22] Filed: Jul. 15, 1993

Related U.S. Application Data

[62] Division of application No. 07/918,772, Jul. 27, 1992, Pat. No. 5,258,341, which is a continuation of application No. 07/636,834, Jan. 2, 1991, abandoned.

[51] Int. Cl.⁶ .................................................. C10G 11/02
[52] U.S. Cl. ................ 208/120.01; 208/118; 208/111.01
[58] Field of Search ................................ 208/120, 121.01

[56] References Cited

U.S. PATENT DOCUMENTS

| | | | |
|---|---|---|---|
| 3,276,993 | 10/1966 | Reid | 208/120 |
| 3,391,075 | 7/1968 | Plank et al. | 208/120 |
| 3,808,326 | 4/1974 | McDaniel et al. | 423/329 |
| 4,242,237 | 12/1980 | Gladrow | 252/455 Z |
| 4,287,048 | 9/1981 | Gladrow et al. | 208/120 |
| 4,289,606 | 9/1981 | Gladrow et al. | 208/120 |
| 4,664,780 | 5/1987 | Lochow | 208/120 |
| 4,793,827 | 12/1988 | Lochow et al. | 44/65 |
| 5,021,146 | 6/1991 | Chin | 208/122 |
| 5,085,762 | 2/1992 | Absil | 208/120 |
| 5,227,352 | 7/1993 | Tsujii et al. | 502/65 |
| 5,258,341 | 11/1993 | Chitnis et al. | 502/68 |

FOREIGN PATENT DOCUMENTS 20366  6/1971  Japan.

*Primary Examiner*—Helane Myers
*Attorney, Agent, or Firm*—Peter W. Roberts; Malcolm D. Keen

[57] ABSTRACT

There is provided a catalyst comprising yttrium containing zeolite Y. The zeolite Y is essentially free of rare earth ions. There is also provided a method for making this catalyst. There is further provided a process for using this catalyst for cracking gas oils. It has been discovered that when yttrium is incorporated into this zeolite Y, and when this catalyst is used to crack gas oils, these results improved gasoline selectivity and reduced dry gas make.

9 Claims, No Drawings

YTTRIUM CONTAINING ZEOLITE Y CRACKING CATALYST

CROSS-REFERENCE TO RELATED APPLICATIONS

This application is a division of U.S. application Ser. No. 07/918,772, filed Jul. 27, 1992, now U.S. Pat. No. 5,258,341, which is a continuation of U.S. application Ser. No. 07/636,834, filed Jan. 2, 1991, now abandoned. The entire disclosures of these applications are expressly incorporated herein by reference.

BACKGROUND

There is provided a yttrium containing zeolite Y catalyst, a method for making this catalyst, and a process for cracking a gas oil using this catalyst. The zeolite Y catalyst is essentially free of rare earth ions.

Catalytic cracking is employed in petroleum refining operations to convert gas oils to higher valued hydrocarbons such as gasoline and distillates, e.g., naphtha and kerosine. These gas oils may come from a number of sources such as atmospheric distillation columns, vacuum distillation columns, cokers and recycle streams. The properties of these gas oils vary with the sources from which they come.

In atmospheric distillation, crude oil is subjected to temperatures of up to about 650° F (343° C.). Higher temperatures tend to thermally degrade the hydrocarbons in the crude oil feedstock. From the atmospheric distillation columns the following fractions may be obtained: a gasoline fraction having a boiling poing of less than about 300° F (149° C.); a naphtha fraction having a boiling range of between about 300° F (149° C.) and about 360° F (182° C.); a kerosine fraction having a boiling range of between about 360° F (182° C.) and about 460° F (238° C.); at least one gas oil fraction having a boiling range of between about 460° F (238° C.) and about 650° F (343° C.); and an atmospheric residua fraction having a boiling point of greater than 650° F (343° C.). The atmospheric residua may comprise a substantial portion, e.g., from about 30% to about 50% by volume, of the whole crude which is subjected to atmospheric distillation.

As mentioned previously, subjecting the hydrocarbons in a petroleum feedstock to temperature of greater than 650° F (343° C.) tends to result in the thermal degradation of hydrocarbons. However, one or more relatively heavy gas oil fractions can be separated from atmospheric residua by subjecting this atmospheric residua to vacuum distillation, whereby higher boiling fractions are obtained. In this way, one or more gas oil fractions having a boiling range between about 650° F (343° C.) and about 1,000° F (538° C.) may be obtained. The vacuum residua having an initial boiling point of greater than about 1,000° F (538° C.) may comprise up to about 25% by volume, e.g., from about 10% to about 25% by volume of a readily refinable whole crude.

Larger, high-boiling temperature hydrocarbons may be converted to smaller, lower-boiling hydrocarbons by cracking processes. Such cracking processes include thermal cracking, which takes place in the absence of a catalyst, and catalytic cracking, which takes place in the presence of a catalyst. Gas oils, which have been separated from petroleum residua, when derived from clean, readily refinable whole crude, tend to be excellent feedstocks for catalytic cracking. However, petroleum residua, including atmospheric residua and, especially, vacuum residua, are far less suitable for inclusion in catalytic cracking feedstocks for a number of reasons. First, such residua fractions contain a large proportion of very large hydrocarbon molecular species, e.g., having boiling points of greater than about 1,000° F (538° C.). Such large hydrocarbon molecules, particularly polynuclear molecules, may tend to be less reactive and may tend to be too large to make effective contact with the active sites of the cracking catalyst. Also, the refining process tends to concentrate, into the residua, species contained in the whole crude which tend to poison the cracking catalyst or otherwise interfere with the catalytic cracking process. Such species include nitrogen, metals such as nickel and vanadium, and carbon residue as measured by CCR, wt. %. In view of these factors, residua fractions tend to be avoided as feedstocks or components thereof for catalytic cracking processes. Instead, residua fractions, particularly vacuum residua, tend to be processed by thermal cracking, typically in a coker.

In accordance with such coking operations, various liquid, thermally cracked products are obtained including coker gasoline and higher boiling fractions. The liquid fraction which has the highest boiling point is a coker gas oil fraction which may have a boiling point of, e.g., from about 450° F (232° C.) to about 850° F (454° C.). This coker gas oil may be used as a feedstock for catalytic cracking along with other gas oils from atmospheric and vacuum distillation.

A particular catalyst for cracking gas oils is a zeolite Y catalyst. U.S. Pat. Nos. 4,793,827 and 4,664,780 describe the cracking of petroleum fraction with rare earth exchanged Y (REY) zeolite which has been ion exchanged to enhance the yttrium content thereof.

SUMMARY

There is provided a catalyst comprising yttrium containing zeolite Y, said zeolite Y being essentially free of rare earth ions.

There is also provided a method for making a catalyst, said method comprising admixing yttrium with zeolite Y, said zeolite Y being essentially free of rare earth ions.

There is further provided a process for cracking a gas oil, said process comprising contacting said gas oil under sufficient cracking conditions with a catalyst comprising yttrium containing zeolite Y, said zeolite Y being essentially free of rare earth ions.

EMBODIMENTS

The zeolite Y which is combined with yttrium is essentially free of rare earth ions. By the term essentially free it will be understood that the catalyst may contain no intentionally added rare earth ions and no more than a trace of nonintentionally added rare earth elements, as measured by elemental analysis, said trace being that quantity of rare earth normally included as an impurity in the zeolite Y. For example, the zeolite Y may contain less than about 0.02 wt % of rare earth elements as measured by elemental analysis.

The zeolite Y catalyst may contain at least 0.1 wt % of yttrium as measured by elemental analysis. A particular range of such amounts of yttrium would be from about 0.1 wt % to about 5.0 wt %.

The cracking conditions for cracking gas oils may include a temperature of from about 300° C. to about 700° C., a pressure of from about 0.1 atmosphere (bar) to about 30 atmospheres and a weight hourly space velocity of from about 0.1 to about 20.

The zeolite Y component of the present catalyst may be a dealuminized Y. A particular example of such a dealuminized Y is a silicon-enriched, dealuminized Y as described in U.S. Pat. No. 4,503,023.

The yttrium containing zeolite Y catalyst may be prepared by combining the zeolite Y with a yttrium compound. The yttrium may be ion exchanged or impregnated onto the zeolite Y. The zeolite Y may be composited with a matrix either before or after the contact with the yttrium compound.

Particular cracking processes, in which the yttrium containing zeolite Y catalyst may be used, include fluid-bed catalytic cracking (FCC) processes and thermofor catalytic cracking (TCC) processes.

The gas oil which is cracked may be passed over the present catalyst alone or in combination with other fractions, such as resids.

The yttrium containing zeolite Y catalyst may be optionally combined with other metals, such as noble metals, e.g., Pt. The incorporation of noble metals and rhenium into the present catalyst may serve to promote CO oxidation, e.g., in an FCC process.

The present catalyst may be used alone or in combination with other zeolite catalysts for cracking gas oils. The combination of a ZSM-5 catalyst with the present catalyst may serve to promote octane enhancement and light olefin production.

Zeolite Y is normally synthesized in forms having silica:alumina ratios up to about 5:1. These as-synthesized forms of zeolite Y may be subjected to various treatments to remove structural aluminum therefrom. Many of these techniques rely upon the removal of aluminum from the structural framework of the zeolite by chemical agents appropriate to this end. A considerable amount of work on the preparation of aluminum deficient faujasites has been performed and is reviewed in Advances in Chemistry Series No. 121, Molecular Sieves, G. T. Kerr; American Chemical Society, 1973. Specific methods for preparing dealuminized zeolites are described in the following and reference is made to them for details of the method: Catalysis by Zeolites ((International Symposium on Zeolites, Lyon, Sept. 9–11, 1980), Elsevier Scientific Publishing Co., Amsterdam, 1980 (dealuminization of zeolite Y with silicon tetrachloride); U.S. Pat. No. 3,442,795 and G.B. No. 1,058,188 (hydrolysis and removal of aluminum by chelation); G.B. No. 1,061,847 (acid extraction of aluminum); U.S. Pat. No. 3,493,519 (aluminum removal by steaming and chelation); U.S. Pat. No. 3,591,488 (aluminum removal by steaming); U.S. Pat. No. 4,273,753 (dealuminization by silicon halide and oxyhalides); U.S. Pat. No. 3,691,099 (aluminum extraction with acid); U.S. Pat. No. 4,093,560 (dealuminization by treatment with salts); U.S. Pat. No. 3,937,791 (aluminum removal with Cr(III) solutions); U.S. Pat. No. 3,506,400 (steaming followed by chelation); U.S. Pat. No. 3,640,681 (extraction of aluminum with acetylacetonate followed by dehydroxylation); U.S. Pat. No. 3,836,561 (removal of aluminum with acid); DE-OS No. 2,510,740 (treatment of zeolite with chlorine or chlorine-contrary gases at high temperatures), NL No. 7,604,264 (acid extraction), JA No. 53,101,003 (treatment with EDTA or other materials to remove aluminum) and J. Catalysis 54 295 (1978) (hydrothermal treatment followed by acid extraction).

Highly siliceous forms of zeolite Y may be prepared by steaming or by acid extraction of structural aluminum (or both) but because zeolite Y in its normal, as-synthesized condition, is unstable to acid, it must first be converted to an acid-stable form. Methods for doing this are known and one of the most common forms of acid-resistant zeolite Y is known as "Ultrastable Y" (USY); it is described in U.S. Pat. Nos. 3,293,192 and 3,402,996 and the publication, Society of Chemical Engineering (London) Monograph Molecular Sieves, page 186 (1968) by C. V. McDaniel and P. K. Maher, and reference is made to these for details of the zeolite and its preparation. In general, "ultrastable" refers to Y-type zeolite which is highly resistant to degradation of crystallinity by high temperature and steam treatment and is characterized by a $R_2O$ content (wherein R is Na, K or any other alkali metal ion) of less than 4 weight percent, preferably less than 1 weight percent, and a unit cell size less than 24.5 Angstroms and a silica to alumina mole ratio in the range of 3.5 to 7 or higher. The ultrastable form of Y-type zeolite is obtained primarily by a substantial reduction of the alkali metal ions and the unit cell size. The ultrastable zeolite is identified both by the smaller unit cell and the low alkali metal content in the crystal structure.

The ultrastable form of the Y-type zeolite can be prepared by successively base exchanging a Y-type zeolite with an aqueous solution of an ammonium salt, such as ammonium nitrate, until the alkali metal content of the Y-type zeolite is reduced to less than 4 weight percent. The base exchanged zeolite is then calcined at a temperature of 540° C. to 800° C. for up to several hours, cooled and successively base exchanged with an aqueous solution of an ammonium salt until the alkali metal content is reduced to less than 1 weight percent, followed by washing and calcination again at a temperature of 540° C. to 800° C. to produce an ultrastable zeolite Y. The sequence of ion exchange and heat treatment results in the substantial reduction of the alkali metal content of the original zeolite and results in a unit cell shrinkage which is believed to lead to the ultra high stability of the resulting Y-type zeolite.

The ultrastable zeolite Y may then be extracted with acid to produce a highly siliceous form of the zeolite.

Other methods for increasing the silica:alumina ratio of zeolite Y by acid extraction are described in U.S. Pat. Nos. 4,218,307; 3,591,488 and 3,691,099 to which reference is made for details of these methods.

A preferred method of preparing highly siliceous forms of zeolite Y by acid extraction of the stabilized zeolite is described in U.S. patent application Ser. No. 379,424, filed May 8, 1982 now abandoned, by R. B. LaPierre, R. D. Partridge and P. T. Reischmann and entitled "Method for Preparing Acid Stable Zeolites and High Silica Zeolites Prepared By It", and reference is made to that application for details of the method.

It may be desirable to incorporate the zeolite Y in another material resistant to the temperature and other conditions employed in the process. Such matrix materials include synthetic or natural substances as well as inorganic materials such as clay, silica and/or metal oxides. The latter may be either naturally occurring or in the form of gelatinous precipitates or gels including mixtures of silica and metal oxides. Naturally occurring clays which can be composited with the zeolite Y include those of the montmorillonite and kaolin families. These clays can be used in the raw state as originally mined or initially subjected to calcination, acid treatment or chemical modification.

The zeolite Y may be composited with a porous matrix material, such as alumina, silica-alumina, silica-magnesia, silica-zirconia, silica-thoria, silica-beryllia, silica-titania as well as ternary compositions, such as silica-alumina-thoria, silica-alumina-zirconia, silica-alumina-magnesia, and silica-magnesia-zirconia. The matrix may be in the form of a cogel with the zeolite. The relative proportions of zeolite component and inorganic oxide gel matrix may vary widely with the zeolite content ranging from between 1 to 99, more usually 10 to 80, percent by weight of the composite. The matrix may itself possess catalytic properties generally of an acidic nature.

In the Examples, which follow, absorption data were determined as follows: A weighted sample was contacted with the desired pure adsorbate vapor at a pressure less than the vapor-liquid equilibrium pressure of the adsorbate at room temperature. Adsorption was complete when a constant pressure in the adsorption chamber was reached (overnight for water, 3 hours for hydrocarbons); e.g., 12 mm of mercury for water and 40 mm for n-hexane and cyclohexane. Samples were then removed and weighed. The increase in weight was calcined as the adsorption capacity of the samples.

EXAMPLE 1

This Example describes the preparation of 3,378 grams of a base case catalyst containing (wt basis) 25% USY, 45.3% silica gel, 3.4% alumina gel, and 25.3% kaolin clay. The catalyst was subsequently exchanged with a rare earth solution.

Two batches of a slurry containing 721 g of USY zeolite (Davison Z-14, SMR 6–1709, Davison Chemical, Division of W. R. Grace & Co., Baltimore, Md.), 4.2 g of Marasperse N-22 dispersant (Reed-Lignin Inc., Greenwich, Conn.), and 1398 g deionized water were ball-milled for 16 hours in one-gallon porcelain ballmills each containing 7.8 pounds of 1/2 inch agate stones. The ballmilled slurries were diluted to 20% solids with deionized rinse water. Both batches were combined to complete preparation of this zeolite slurry (slurry A). A slurry (slurry B) was prepared by mixing 69.48 lb deionized water, 29.8 lb ice, 1,826 g kaolin clay (Georgia Kaolin Co., Elizabeth, N.J., 80.5% solids), and 20.8 lb N-Clear (PQ Corporation, Valley Forge, PA, 28.8% $SiO_2$, 8.8% $Na_2O$). Slurry B, was further neutralized by the addition of 852 g of $H_2SO_4$ and a solution of aluminum sulfate (General Chemicals Co., Morristown, N.J.) containing 204 g of alumina as $Al_2O_3$. An amount equal to 15.57 lb (19.78% solids) of slurry A was then mixed well into slurry B. This resultant slurry was dewatered, reslurried to 11 wt % solids, homogenized and spray dried at an outlet temperature of 370±10° F. The spray dryer (Komline Sanderson, Peapack, N.J.) was operated at 5.5 psig air pressure with a 0.06" nozzle at 250 ccm feed rate using a Moyno feed pump (Springfield, Ohio). The spray dried catalyst was water washed twice followed by $NH_4^+/Na^+$ column exchange using 5 cc of 1N $NH_4NO_3$/gram catalyst. The exchanged catalyst was washed with 10 cc of deionized water/gram catalyst and Hotpack dried overnight at 250° F. The exchanged catalyst was then slurried with an amount of deionized water equal to 2.4 times the weight of catalyst and an amount of 1.5% $RECl_3$ solution equal to 2.4 times the weight of the catalyst for three hours. The catalyst then filtered and washed with a total of 24 liters of deionized water. The catalyst was Hotpack dried at 250° F.

EXAMPLE 2

The procedure used to prepare the catalyst described in Example 1 was repeated with the exception that instead of further exchanging the $NH_4^+/Na^+$ exchanged catalyst with the rare earth solution, the $NH_4^+/Na^+$ exchanged catalyst was further exchanged with a 1.76% $Y_2(SO_4)_3$ solution (Aldrich Chemical Co., Inc., Milwaukee, Wis.). This was accomplished by slurrying the catalyst with an amount of water equal to 2.5 times the weight of the catalyst, adding an amount of the yttrium sulfate solution equal to 2.5 the catalyst weight over one hour, and mixing for an additional two hours. The resultant slurry was filtered and washed. This catalyst (2,098 g) was then Hotpack dried at 250° F. Chemical and physical properties of the catalysts of Examples 1 and 2 are given in Table I.

EXAMPLE 3

To determine the effect of yttrium post-exchange on catalytic performance, the catalysts of Examples 1 and 2 were evaluated in a fixed-fluidized bed (FFB) unit at 960° F temperature, 1.0 minute catalyst contact time using a sour heavy gas oil (SHGO) as feed and varying the catalyst/oil ratios. The SHGO charge stock properties are given in Table II. The FFB results (after interpolation at 65 vol % conversion) are summarized in Table III.

As is evident in Table III, the effect of yttrium on catalyst performance (relative to the base case catalyst of Example 1) is as described below:

0.5 wt % more gasoline 0.6 wt % less dry gas

The above yield shifts are very desirable.

TABLE I

| Chemical and Physical Properties | | |
|---|---|---|
| Catalysts of Example | 1 | 2 |
| Chemical Analysis (db) | | |
| $SiO_2$, wt %[1] | 78.1 | 80.8 |
| $Al_2O_3$, wt %[1] | 20.0 | 20.7 |
| Na, ppm[1] | 727 | 589 |
| Rare earth oxides, wt %[2] | 1.60 | 0.01 |
| Yttrium, wt %[2] | na[5] | 0.80 |
| Physical Properties[2] | | |
| PV, cc/gm[3] | 0.38 | 0.39 |
| SA, $M^2$/gm[4] | 142 | 118 |
| Sorptions | | |
| $H_2O$, g/100 g | 2.8 | 1.9 |
| cyclohexane, g/100 g | 4.5 | 3.8 |
| n-hexane, g/100 g | 4.1 | 3.3 |

[1]After $NH_4^+/Na^+$ exchange followed by air drying overnight at 250° F.
[2]After steaming at 1450° F., 0 psig, 45% steam for 10 hours.
[3]PV stands for pore volume.
[4]SA stands for surface area.
[5]na stands for not added.

TABLE II

| Charge Stock | Sour Heavy Gas Oil (SHGO) |
|---|---|
| Gravity, API | 24.3 |
| Aniline Pt., ° F. | 171 |
| Hydrogen, wt % | 12.3 |
| Sulfur, wt % | 1.87 |
| Nitrogen, wt % | 0.10 |
| Basic Nitrogen, ppm | 327 |
| Conradson Carbon, wt % | 0.28 |
| K.V. @ 210° F. | 3.6 |
| Bromine No. | 4.2 |
| R.I. @ 70° F. | 1.5080 |
| Molecular Weight | 358 |
| Pour Point, ° F. | 85 |
| Paraffins, wt % | 23.5 |
| Naphthenes, wt % | 32.0 |
| Aromatics, wt % | 44.5 |
| Aromatic Carbon, wt % | 18.9 |
| Ni, ppm | 0.3 |
| V, ppm | 0.6 |

TABLE III

Effect of Yttrium on Catalytic Performance
(Test Conditions: FFB, SHGO feed, 1 min. contact time, 960° F., at varying catalyst/oil ratios)
(Steaming Conditions: 10 hours at 1450° F., 45% steam, 0 psig)
(Results interpolated at 65 vol % conversion)

| Catalysts of Example | | 1 | 2 |
|---|---|---|---|
| Conversion, Wt % (@ 65 vol %) | | 62.2 | 62.1 |
| I. | Product Yields | | |
| | $C_5^+$ Gasoline, Wt % | 46.0 | 46.5 |
| | Total $C_4$'s, Wt % | 8.0 | 8.2 |
| | Dry Gas, Wt % | 5.9 | 5.3 |
| | Coke, Wt % | 2.3 | 2.1 |
| II. | Gasoline RON + 0 | 88.5 | 88.5 |
| III. | Conv., Vol % @ 4/1 Cat/Oil | 70.5 | 71.2 |

What is claimed is:

1. A process for cracking a gas oil, said process comprising contacting said gas oil under sufficient cracking conditions with a catalyst comprising yttrium containing ultrastable zeolite Y, said zeolite Y being essentially free of rare earth ions, wherein said cracking conditions include a temperature of from about 300° C. to about 700° C., a pressure of from about 0.1 atmosphere (bar) to about 30 atmospheres and a weight hourly space velocity of from about 0.1 to about 20, wherein said catalyst contains at least 0.1 wt % yttrium, wherein said catalyst contains no intentionally added rare earth ions, and wherein said zeolite Y contains no more than about 0.02 wt % of rare earth elements as measured by elemental analysis.

2. A process according to claim 1, wherein said process is a fluid-bed catalytic cracking or a thermofor catalytic cracking process.

3. A process according to claim 1, wherein said gas oil is combined with a resid.

4. A process according to claim 1, wherein said zeolite Y is a dealuminated Y.

5. A process according to claim 1, wherein said zeolite Y is a silicon-enriched, dealuminated Y.

6. A process according to claim 1, said catalyst further comprising a matrix for said zeolite Y.

7. A process according to claim 6, said catalyst comprising from 10 wt % to 80 wt % of said zeolite Y.

8. A process according to claim 7, wherein said matrix comprises silica, alumina or silica-alumina.

9. A process according to claim 8, wherein said matrix further comprises clay.

\* \* \* \* \*